United States Patent
Weber

(10) Patent No.: US 6,435,070 B1
(45) Date of Patent: Aug. 20, 2002

(54) AUTOMATICALLY SHARPENABLE SAW CHAIN

(75) Inventor: Johann Weber, Estacada, OR (US)

(73) Assignee: Blount, Inc., Portland, OR (US)

( * ) Notice: Subject to any disclaimer, the term of this patent is extended or adjusted under 35 U.S.C. 154(b) by 0 days.

(21) Appl. No.: 09/815,184

(22) Filed: Mar. 22, 2001

(51) Int. Cl.[7] .................................................. B26D 1/46
(52) U.S. Cl. ........................................... 83/834; 83/830
(58) Field of Search .............................. 83/830, 31, 32, 83/33, 34, 853, 54, 85, 676

(56) References Cited

U.S. PATENT DOCUMENTS

| | | | | |
|---|---|---|---|---|
| 2,924,110 A | * | 2/1960 | Gudmundsen | 83/853 X |
| 3,714,974 A | * | 2/1973 | Bullard | 83/831 |
| 3,921,490 A | | 11/1975 | Dolata | |
| 4,023,453 A | | 5/1977 | Dolata | |
| 4,348,926 A | * | 9/1982 | Dolata et al. | 83/834 X |
| 4,393,739 A | * | 7/1983 | Olmr | 83/834 |
| 4,643,065 A | * | 2/1987 | MacGavin | 83/834 X |
| 4,896,575 A | * | 1/1990 | Sundstrom | 83/833 |
| 6,006,629 A | * | 12/1999 | Lofgren | 83/834 X |
| 6,128,997 A | | 10/2000 | Nitschmann | |

* cited by examiner

Primary Examiner—M. Rachuba
Assistant Examiner—Jason Prone
(74) Attorney, Agent, or Firm—Robert L. Harrington; Schwabe, Williamson & Wyatt, P.C.

(57) ABSTRACT

A saw chain formed in part from planar cutting link blanks including a cutter portion having a top edge surface and a side surface that intersect to form a line edge. A leading portion of the cutting link blank is twisted out of the plane of the blank so that the line edge becomes the cutting edge of the cutter and extends from the plane of the body to encompass the width of one side of the saw chain. Alternating cutting link are formed to have oppositely extended cutting edges to encompass the width of the saw chain. The cutting links preferably form certain of the center links of an assembled saw chain.

6 Claims, 3 Drawing Sheets

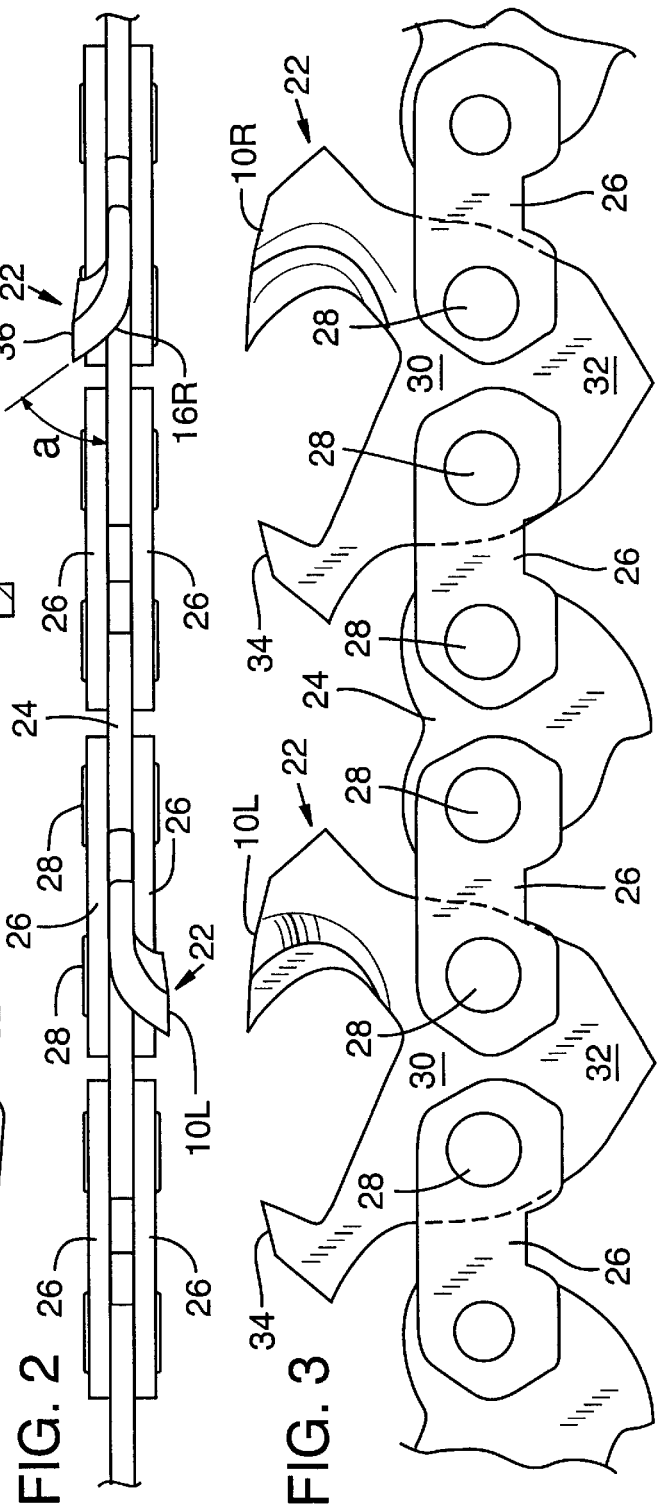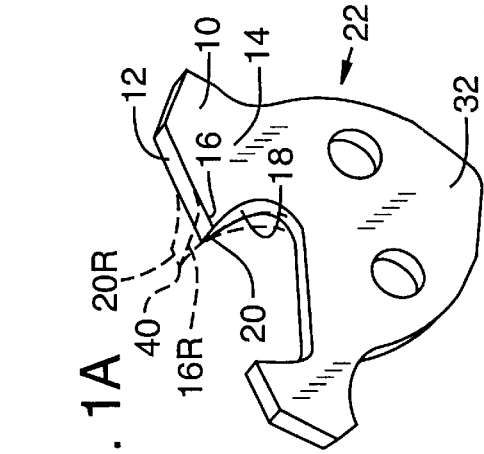

AUTOMATICALLY SHARPENABLE SAW CHAIN

FIELD OF THE INVENTION

This invention relates to a saw chain such as mounted on a chain saw or tree harvester and used for sawing and bucking trees, and more particularly to a saw chain that can be sharpened automatically.

BACKGROUND OF THE INVENTION

Automatic sharpening of saw chains for hand held chain saws was developed in the 1960's. These chains are typically referred to as top sharpening chains in that they are designed to be sharpened from the top side of the cutting tooth rather than at the bottom side as in conventional saw chains. Top sharpening can be accomplished with a sharpening stone that is simply moved from an overlying position into contact with the protruding cutting edge with the chain mounted to the bar and while the chain is traveling around the bar. A stone mounted in the chain saw housing is lowered into contact with the cutting edge simply by pressing a button (automatic sharpening). An example of such chain is illustrated in U.S. Pat. No. 4,625,610.

There are two principal problems associated with top sharpening saw chain. There is a concern for potential kick back as the saw chain passes around the nose of the bar (a safety concern) due to the inherent design of the chain. Also, the chain is difficult to produce, most notably in the application of chrome to the cutting tooth. Chrome is desirable for maintaining sharpness and is applied to the side of the cutting tooth opposite the side that is filed for resharpening. In a top sharpening chain, this requires that chrome be applied to the underside of the cutting tooth. As can be observed in the '610 patent, this side of the tooth is located in a tightly spaced cavity that is not easily accessible for applying the chrome and the chrome is either not applied adequately or the cost of doing so is excessive.

In the field of harvesting trees, the operation of cutting trees has substantially shifted from manual cutting, i.e., loggers wielding hand held saws, to machine cutting, where a chain saw is mounted on an articulated boom carried by a mobile machine, the saw being manipulated from the safety of an operator's cab. Such mobile machines are often referred to as tree harvesters.

In tree harvester cutting, the concern for kick back is minimal. However chain sharpness is a substantial concern. A tree that is being cut and particularly in bucking the tree length into, e.g., eight foot lengths, is prone to splitting. Such splitting is alleviated by the increased speed in cutting through the tree and vice versa, splitting increases as the cutting speed is reduced. A sharp versus dull chain cuts faster and thus reduces splitting, a major concern for trees being cut for lumber production.

Tree harvesters are very expensive to purchase and operate and can be justified only because of increased cutting efficiency. To interrupt operation of a tree harvester so as to replace a dull chain with a sharp chain is a balance of efficiencies. A sharp chain cuts through a log in less time and reduces splitting occurrences. Also, a sharp chain requires less force while cutting and increases the wear life of the chain and bar, i.e., at the surfaces where the chain slides along the bar edge. However, these advantages have to be weighed against the undesired down time to replace the dull chain with a sharper chain. A further consideration is operator resistance. Particularly in bad weather conditions, the operator of the machine is disinclined to leave the comfort of the cab to wrestle with chain removal and replacement. Tree harvesting can accordingly be benefitted by automatic sharpening which eliminates the need for replacing the chain in order to maintain cutting chain sharpness.

BRIEF DESCRIPTION OF THE INVENTION

For the purpose of explaining this invention, the cutting link is considered to have a chassis and a cutting portion that is extended upwardly or outwardly from the chain (the chain being a continuous loop and the cutting portion extending away from the loop center) which cutting portion is formed into a cutting tooth.

Typically a depth gauge also extends upwardly from the chassis and leads the cutting tooth so as to limit the depth of cut to be taken by the cutting tooth.

As will be appreciated, prior top sharpening chains, e.g., as shown in the '610 patent, provide a top sharpenable cutting edge by lateral folding of the cutting portion in a manner to create a top plate that is severely sloped downwardly front to back. By grinding the front of the top plate to provide a flat top surface substantially parallel to the rivets, a sharp leading edge is created between the thus created top surface and the under surface of the top plate. This is the cutting edge and it is resharpened by repeated grindings of the top surface. (Whereas the top surface is described as being flat, because it is ground as the chain travels in a curve, the top surface is slightly curved downwardly front to back and provides a desired relief that alleviates rubbing of the top surface along the kerf bottom, this being a known advantage to the industry.)

Forming the present top sharpening chain is schematically illustrated in FIG. 1A. It should be first noted that there is no lateral folding to produce a top plate. The cutting portion 10 of the cutting link 22, before forming, is shown in solid lines. The cutting portion 10 is not folded as in the '610 patent and instead is simply bent as shown in the dash line position. The pertinent features of the cutting portion (solid line) includes a top edge surface 12, a side surface 14 and edge line 16 between surfaces 12 and 14. In the preformed condition, the cutting portion 10 has a leading edge surface 18 and edge line 20 between surfaces 18 and 12. The dash lines illustrate the forming of the top plate into a right hand cutter link. The forming operation produces bending of the cutting portion 10 toward one side, e.g., to the right as shown in dash line. As thus bent or curved, the edge line 16R in the area of the bend becomes the leading cutting edge. The edge 20R is shaped by grinding off the material that protrudes laterally beyond point 40 (the juncture of edge line 16R and edge line 20R) and as thus shaped forms the side cutting edge of the cutting link. In production, as presently contemplated, the leading edge 16R is also finally shaped in production by grinding. Edge surface 12 is sloped downwardly and rearwardly whereby flat grinding of the top of the leading portion of the cutting portion resharpens the cutting edges.

It is considered preferable to form the cutters of the present invention as the center or drive links of the saw chain as shown. The cutter as shown in dash lines in FIG. 1A is a right hand cutter link. A left hand cutter link is formed by forcing the front of the cutting portion 10 to the opposite side. The combined width of the left and right hand cutting edges 16R and 16L extend laterally the width of the chain as illustrated in FIG. 1B (the cutters shown in overlapping relation for illustration purposes). The cutting links of FIG. 1B are assembled by rivets 28 to side links 26.

Also illustrated in FIG. 1B (schematically) is a sharpening stone SS that is to be mounted on a chain saw housing, e.g., of a tree harvester. The sharpener SS is mounted for limited and controlled movement up and down as indicated by the arrows. As will be apparent, the sharpening stone resharpens the cutting edges 16 (16R and 16L) of the cutting links with controlled up and down movement of the sharpening stone. The sharpening stone additionally maintains the desired depth gauge height as will be described.

Whereas the above is believed to generally describe the invention, reference to the following detailed description and accompanying drawings will provide a more complete understanding and enablement for persons skilled in the art.

BRIEF DESCRIPTION OF THE DRAWINGS

FIGS. 1A and 1B schematically illustrate the preferred embodiment of a saw chain cutter link and an assembled saw chain being sharpened in accordance with the invention;

FIG. 2 is a top view of an assembled saw chain of the present invention;

FIG. 3 is a side view of the saw chain of FIG. 2;

DESCRIPTION OF THE PREFERRED EMBODIMENT

Figure 5:
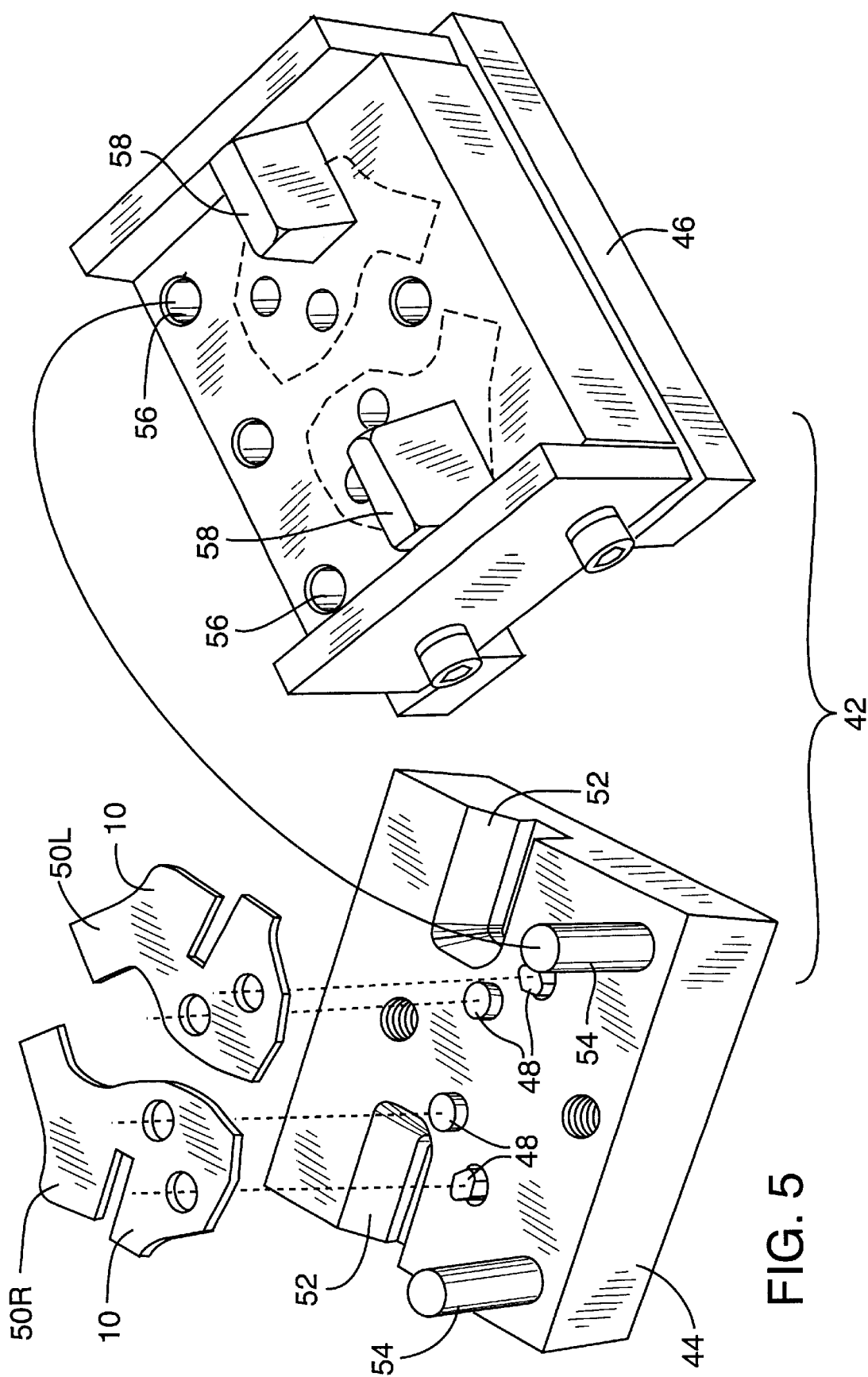
FIG. 5 schematically illustrates a fixture used to form the cutters of the present invention.

FIGS. 2 and 3 illustrate a saw chain produced in accordance with the present invention. The cutters or cutting links 22 are formed as explained in the Brief Description Of The Invention and as schematically illustrated in FIGS. 1A and 1B. A fixture used to form the cutters is illustrated in FIG. 5 and will be further discussed hereafter.

FIGS. 2 and 3 illustrate a section of an assembled saw chain adapted for mounting to a chain saw (hand held or tree harvester). As will be noted, alternating right and left cutting links 22 are provided as center or drive links rather than side links as is typical for cutting chain. Interposed between each pair of cutting links 22 is a conventional center link 24 and interconnecting the center links 22, 24 (via rivets 28) are pairs of side links 26.

The cutter links 22 are illustrated in side view in FIG. 3. Each cutter link 22 includes a chassis or body portion 30 having a depending tang 32 that slides along a bar groove of a guide bar. Extended upward from the front of the chassis 30 is a depth gauge portion 34 and extended upwardly from the rear of the chassis is a cutting portion 10. As will be noted from comparison of FIGS. 2 and 3, the leading cutter or cutting link 22 (right to left as viewed) has a cutting portion 10L that is bent from the plane of the chassis to the left and the following cutter 22 has a cutting portion 10R that is bent from the plane of the chassis to the right.

The bending process (which will be later discussed) involves a forming operation where the nose end or leading end of the cutting portion 10 is twisted sideward and out of the plane of the body portion 30 (the metal being at least partially deformed). With reference to cutting portion 10R of FIG. 4, consider that a die punch is forced against the area indicated by the dash line circle 38. This produces bending or twisting of the front end of the cutting portion as shown. The former leading line edge 20 is now a side line edge 20R. The former side line edge 16 becomes a leading line edge 16R. It is desirable that the angle a as shown in FIG. 2, i.e., the angle between cutting edge line 16R and the plane of body portion 30, is maintained between about 40 degrees and 70 degrees. This produces the desired angle of penetration into the wood being cut.

Additionally, the top plate is configured so that, as twisted or bent, the surface 12 slopes downwardly and rearwardly and the now leading under surface 14 (circle 38 of FIG. 4) is sloped downwardly and rearwardly both in a manner whereby grinding with an overlying sharpening stone (FIGS. 1B and 6B) will wear away a blunt edge (resulting from prolonged cutting action) to re-establish a sharp edge. The angled surface 12 also provides a desired relief behind the cutting edge 16R to reduce the frictional dragging of this surface along the bottom of the kerf being cut.

Figures 4, 6A, 6B:
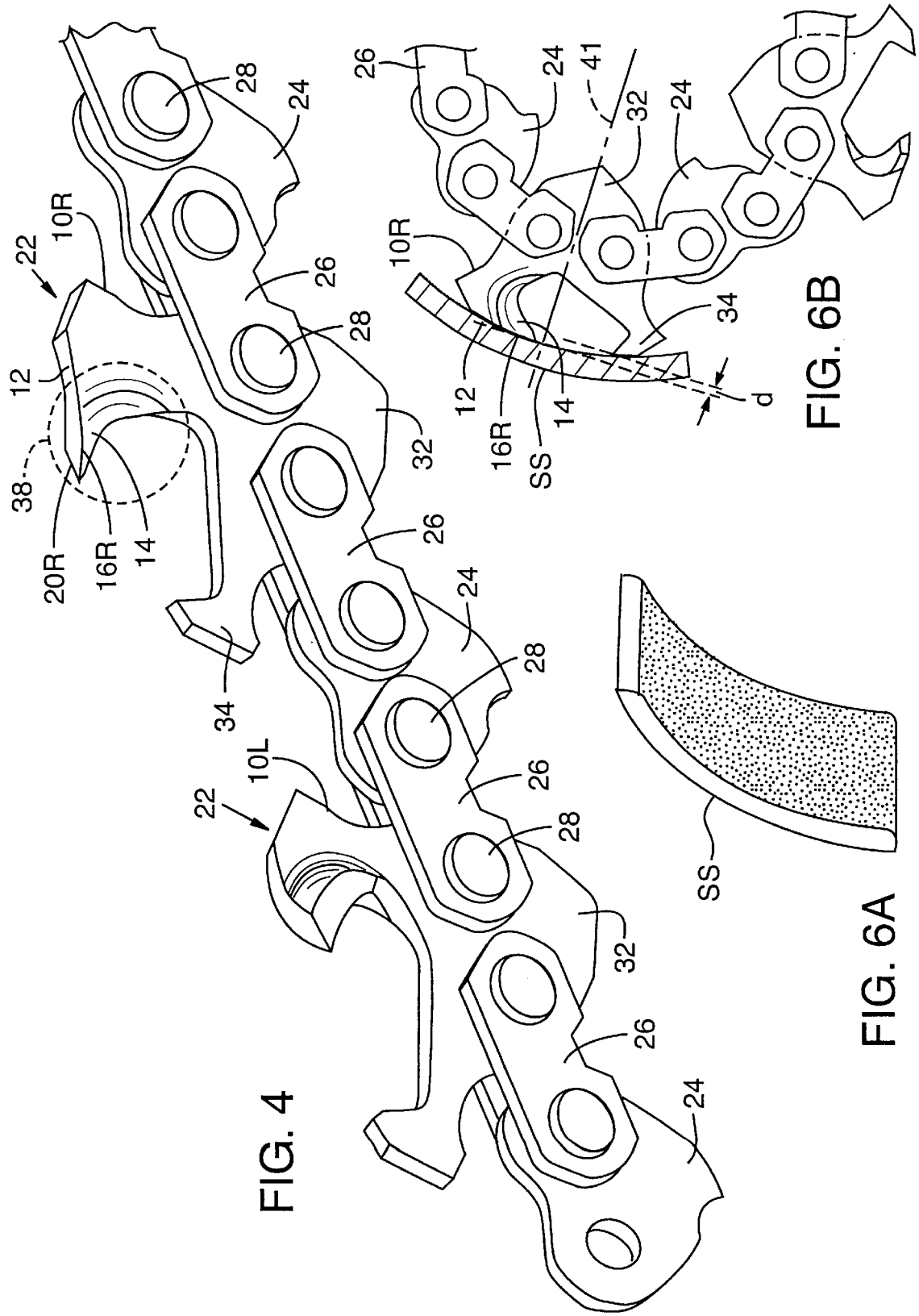
FIG. 4 is a perspective view of the saw chain of FIGS. 2.
FIGS. 6A and 6B schematically illustrate a sharpener and the process for automatic sharpening of a saw chain cutter link of the present invention.

The sharpening stone SS is shown in FIGS. 6A and 6B. It will be appreciated that the stone is mounted, e.g., to a chain saw housing at the rear end of the guide bar and adjacent the drive sprocket whereat the chain is traveling in an arc. As known from prior sharpening saw chain systems, the sharpening of the cutting edge 16 of the cutting portion 10 is accomplished simultaneously with maintaining the height of depth gauge 34. This is a matter of positioning the depth gauge 34 a further distance from the center line 41 than the position of cutting edge 16R from the center line as illustrated in FIG. 6B. The depth gauge setting below the cutting edge 16R is illustrated by distance d in FIG. 6B.

FIG. 5 illustrates (crudely and schematically) a fixture used to shape the top plates 10R and 10L. This fixture was designed to produce prototypes of the chain and it illustrates the twisting/forming operation. Other fixtures will likely be developed for mass production purposes. As shown, the fixture 42 includes a bottom portion 44 and a top portion 46. Cutting link blanks 50R and 50L are positioned on the bottom portion 44 as dictated by positioning pins 48. As positioned, the cutter head portions 10R and 10L are positioned over cavities 52. The top portion 46 is then mounted to the bottom portion 44 with the aligning pins 54 of portion 44 inserted into aligning bores 56. The portions are then forced together. The forming blocks 58 engage the portion of the top plates 10 positioned over cavities 52 and the top plates are pressed into the shape dictated by the cavities and the blocks 58. It will be noted that the block and cavities are cooperatively wedge shaped to accomplish this purpose. The effect of the swaging operation is to form the cutters 10 into the desired shape as previously explained.

Whereas the above disclosure illustrates a preferred embodiment of the invention, those skilled in the art will conceive of numerous variations and modifications without departing from the intended scope of the invention. Accordingly, the invention is to be determined by the claims dependent hereto and not limited to the above disclosure. Specifically the claims are not written in the means plus function format of 35 U.S.C. §112 Para 6.

What is claimed is:

1. A saw chain cutting link comprising:
   a body portion having a cutting portion extended upwardly from the body portion, said cutting portion having a trailing portion co-planar with the body portion and a configured leading portion;
   said cutting portion having first and second side surfaces separated by a plate thickness, the plate thickness defining a leading edge surface and a top edge surface;
   said leading edge surface and said top edge surface intersecting to form a first line edge and said first side surface and said top edge surface intersecting to form a second line edge;
   said configured leading portion including said first line edge and a leading portion of said second line edge formed into a curve directed toward the second side surface to form said leading portion of the second line edge into a leading cutting edge of the cutting link, said trailing portion including a trailing portion of said second line edge remaining in co-planar relation with said body portion.

2. A saw chain cutting link as defined in claim 1 wherein the first line edge and the second line edge intersect to form a point, said point forming the forward most point of the leading cutting edge of the cutting link.

3. A saw chain cutting link as defined in claim 2 wherein said top edge surface and the leading edge surface are angled downwardly and rearwardly to accommodate top sharpening of the leading cutting edge of the cutting link.

4. A saw chain including a plurality of cutting links as defined in claim 3, said saw chain assembled into pivotally connected side links and center links, said cutting links being center links of the saw chain and the successive cutting links in the saw chain having cutting edges directed to one side and then the other to encompass the width of the saw chain.

5. A saw chain cutting link as defined in claim 1 wherein said body portion defines an elongate plane, said first line edge shaped to produce a side cutting edge substantially parallel to said plane, and said leading cutting edge at an angle with said elongate plane within the range of about 40 degrees to 70 degrees.

6. A method of producing a cutting link which comprises:

forming a planar cutting link blank defining a plane, said blank having a body portion and an upwardly directed cutter portion, said cutter portion having a first side surface and a second side surface and said cutting link blank having a thickness that provides a leading edge surface and a top edge surface that intersect to define a first line edge, said top edge surface and first side surface intersecting to define a second line edge;

laterally twisting a leading end and not a trailing end of said cutter portion out of said plane including said first line edge and a portion of said second line edge, said portion of said second line edge thereby providing a leading cutting edge of the cutting link and a trailing portion of said second line edge remaining in said plane.

* * * * *